United States Patent
De Gaudemaris et al.

(10) Patent No.: US 9,290,626 B2
(45) Date of Patent: *Mar. 22, 2016

(54) METHOD FOR PREPARING A MASTERBATCH OF DIENE ELASTOMER AND SILICA

(71) Applicants: COMPAGNIE GENERALE DES ETABLISSEMENTS MICHELIN, Clermont Ferrand (FR); MICHELIN RECHERCHE ET TECHNIQUE, S.A., Granges-Paccot (CH)

(72) Inventors: Benoit De Gaudemaris, Clermont-Ferrand (FR); Geraldine Laffargue, Clermont-Ferrand (FR); Julien Berriot, Clermont Ferrand (FR)

(73) Assignees: COMPAGNIE GENERALE DES ETABLISSEMENTS, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/350,299

(22) PCT Filed: Oct. 10, 2012

(86) PCT No.: PCT/EP2012/070031
§ 371 (c)(1),
(2) Date: Apr. 7, 2014

(87) PCT Pub. No.: WO2013/053736
PCT Pub. Date: Apr. 18, 2013

(65) Prior Publication Data
US 2014/0249249 A1    Sep. 4, 2014

(30) Foreign Application Priority Data

Oct. 11, 2011 (FR) .................................. 11 59178

(51) Int. Cl.
*C08J 3/215* (2006.01)
*B60C 1/00* (2006.01)
*C08J 3/22* (2006.01)
*C08J 3/205* (2006.01)
*C08K 3/36* (2006.01)

(52) U.S. Cl.
CPC ............... *C08J 3/215* (2013.01); *B60C 1/0016* (2013.04); *C08J 3/2053* (2013.01); *C08J 3/226* (2013.01); *C08K 3/36* (2013.01); *C08J 2307/02* (2013.01); *C08J 2321/00* (2013.01); *C08J 2407/02* (2013.01); *C08J 2409/10* (2013.01); *C08J 2415/02* (2013.01); *C08J 2421/02* (2013.01); *Y02T 10/862* (2013.01)

(58) Field of Classification Search
CPC ..................................... C08J 3/20; C08K 3/36
See application file for complete search history.

(56) References Cited

U.S. PATENT DOCUMENTS

| 3,700,619 | A | 10/1972 | Oliver |
| 3,700,620 | A | 10/1972 | Oliver |
| 2010/0022684 | A1* | 1/2010 | Wallen ..................... C08J 3/215 523/334 |
| 2012/0108732 | A1* | 5/2012 | Nakayama et al. ........... 524/508 |
| 2012/0259035 | A1 | 10/2012 | Berriot et al. |

FOREIGN PATENT DOCUMENTS

WO   2011051216   5/2011

OTHER PUBLICATIONS

International Search Report for PCT/EP2012/070031 dated Nov. 11, 2012.

\* cited by examiner

*Primary Examiner* — Hannah Pak
(74) *Attorney, Agent, or Firm* — Dickinson Wright PLLC

(57) ABSTRACT

Preparation of a masterbatch of diene elastomer and silica including preparing at least one silica dispersion in water; bringing into contact and mixing an elastomer latex and the aqueous silica dispersion in the presence of a calcium salt in order to obtain a coagulum; and recovering the coagulum and drying the recovered coagulum in order to obtain the masterbatch. The molar content of calcium cations, defined as the number of moles of calcium cations of the calcium salt per BET unit area of the silica, is between $1.19*10^{-6}$ and $2.81*10^{-6}$ mol/m².

18 Claims, No Drawings

METHOD FOR PREPARING A MASTERBATCH OF DIENE ELASTOMER AND SILICA

This application is a 371 of PCT/EP2012/070031, filed 10 Oct. 2012, which claims benefit under 35 U.S.C. §119 of the filing date of French patent application 1159178, filed 11 Oct. 2011, the entire contents of which is incorporated herein by reference for all purposes.

BACKGROUND

1. Field

The disclosure relates to the preparation of a masterbatch of diene elastomer and silica comprising at least one silica, a calcium salt and a diene elastomer latex, in particular a natural rubber latex.

2. Description of Related Art

The term "masterbatch" is understood to mean an elastomer-based composite into which a filler and optionally other additives have been introduced.

The present disclosure relates to in particular to the use of such a masterbatch in the manufacture of diene rubber compositions reinforced with an inorganic filler intended for the manufacture of tires or semifinished products for tires, in particular treads of these tires.

It is known, in order to obtain optimum reinforcing properties conferred by a filler in a tire tread and thus a high wear resistance, that it is generally advisable for this filler to be present in the elastomer matrix in a final form which is both as finely divided as possible and as homogeneously distributed as possible. In point of fact, such conditions can only be achieved insofar as this filler exhibits a very good ability, on the one hand, to be incorporated in the matrix during the mixing with the elastomer and to deagglomerate and, on the other hand, to disperse homogeneously in this matrix.

In a known way, carbon black exhibits such abilities, which is generally not the case with inorganic fillers, in particular silicas. This is because, for reasons of reciprocal affinities, these inorganic filler particles have an unfortunate tendency, in the elastomer matrix, to agglomerate with one another. These interactions have the harmful consequence of limiting the dispersion of the filler and thus the reinforcing properties to a level substantially below that which it would be theoretically possible to achieve if all the bonds (inorganic filler/elastomer) capable of being created during the mixing operation were actually obtained; these interactions tend, moreover, to increase the consistency in the raw state of rubber compositions and thus to render their processability more difficult than in the presence of carbon black.

Ever since savings in fuel and the need to protect the environment have become a priority, it has proved necessary to produce tires having a reduced rolling resistance without having a disadvantageous effect on their wear resistance.

This has been made possible in particular by virtue of the use, in the treads of these tires, of novel rubber compositions reinforced with inorganic fillers, especially with specific silicas of the highly dispersible type, capable of competing, from the reinforcing viewpoint, with a conventional tire-grade carbon black, while giving these compositions a lower hysteresis, synonymous with a lower rolling resistance for the tires comprising them, and an improved grip on wet, snowy or icy ground.

Treads filled with such highly dispersible silicas (denoted "HD" or "HDS" for "highly dispersible" or "highly dispersible silica"), which can be used in tires having a low rolling resistance sometimes described as "Green Tires" for the energy saving offered to the user ("Green Tire concept"), have been extensively described. Reference will in particular be made to Patent Applications EP 501 227, EP 692 492, EP 692 493, EP 735 088, EP 767 206, EP 786 493, EP 881 252, WO99/02590, WO99/02601, WO99/02602, WO99/06480, WO00/05300 and WO00/05301.

These documents of the prior art teach the use of silicas of the HD type exhibiting a BET specific surface of between 100 and 250 $m^2/g$. In practice, an HD silica having a high specific surface acting as reference in the field of "Green Tires" is in particular the Zeosil 1165 MP silica (BET specific surface equal to approximately 160 $m^2/g$) sold by Rhodia. The use of this Zeosil 1165 MP silica makes it possible to obtain good compromises as regards tire performance, in particular a satisfactory wear resistance and a satisfactory rolling resistance.

The advantage of using a silica having a high specific surface lies mainly in the possibility of increasing the number of bonds of the silica with the elastomer and thus of increasing the level of reinforcement of the latter. This is why it appears advantageous to use, in rubber compositions for tire treads, silicas having a high specific surface, possibly greater than that conventionally used of the order of 160 $m^2/g$, in order in particular to improve the wear resistance of these treads. Nevertheless, the dispersibility of the filler and the increase in its specific surface are regarded as contradictory characteristics. This is because a high specific surface supposes an increase in the interactions between filler items and thus a poor dispersion of the filler in the elastomer matrix and also a difficult processability.

Another type of solution has been envisaged which consists, in order to improve the dispersibility of the filler in the elastomer matrix, in mixing the elastomer and the filler in the "liquid" phase. To do this, recourse has been had to an elastomer in the latex form, which exists in the form of elastomer particles dispersed in water, and to an aqueous dispersion of filler, that is to say a silica dispersed in water, commonly known as silica slurry. However, bringing the elastomer latex and the slurry into contact does not make it possible (not troublesome for the position of the problem, which relates to the silica only) to have coagulation within the liquid medium, which coagulation should make it possible to obtain a solid which, after drying, results in the production of the desired masterbatch of elastomer and silica.

This is because the silica aggregates are typically hydrophilic in nature and have an affinity with the water; thus, the silica aggregates have more affinity with the water than with the elastomer particles themselves.

Different solutions have been provided to make it possible nevertheless to obtain this coagulation and a good dispersion of the filler in the elastomer matrix in the "liquid" phase by the combined use of an agent which makes it possible to increase the affinity between the elastomer and the silica, such as a coupling agent, and of an agent which makes it possible to bring about solidification, thus coagulation, known as coagulating agent.

Thus, for example, U.S. Pat. No. 5,763,388 provides for the incorporation of silica in the rubber latex by treating the silica with a coupling agent and mixing the silica, thus treated, in the presence of conventional coagulating agents.

Patent EP 1 321 488 also intends to bring an aqueous dispersion with negatively charged silica and a diene elastomer latex into contact with an emulsion comprising a polysulphide coupling agent, in the presence of a coagulating agent, such as a polyamine.

Patent EP 1 323 775 also provides bringing an aqueous dispersion comprising an inorganic filler, such as a silica, into contact with an elastomer latex in the presence of a coagulating agent which can be composed, according the list envisaged in this document, of sodium chloride, potassium chloride, salts, acids, and the like. More preferably, this method describes an additional stage which makes possible the in situ formation of the inorganic filler during the mixing between the aqueous dispersion comprising a precursor capable of forming the inorganic filler and the latex, before adding a coagulating agent.

SUMMARY

The Applicant Companies have discovered, surprisingly, a simplified method for obtaining a silica/elastomer masterbatch prepared in the "liquid" phase using a specific salt in a low predetermined amount, without the need for the addition of other additives or coagulating agents. This method makes it possible in particular to achieve a very good level of yield (greater than 80% by weight) while observing the content of filler introduced beforehand and a good dispersion of the filler in the elastomer matrix.

The method for preparing a masterbatch of diene elastomer and silica in accordance with an embodiment of the invention comprises the following successive stages:
preparing at least one dispersion of silica in water,
bringing into contact and mixing an elastomer latex and the aqueous silica dispersion in the presence of a calcium salt, in order to obtain a coagulum,
recovering the coagulum,
drying the recovered coagulum in order to obtain the masterbatch;
the molar content of calcium cations, defined as the number of moles of calcium cations of the calcium salt per unit of silica surface area (expressed in mol/m$^2$), is between $1.19 \times 10^{-6}$ and $2.81 \times 10^{-6}$ mol/m$^2$.

It should be noted in particular that, surprisingly, small amounts of calcium salts coming within the abovementioned ranges, in the absence of silica dispersion, do not make it possible to produce coagulation of the diene elastomer latex alone.

Advantageously, the diene elastomer latex is a natural rubber latex and in particular a concentrated natural rubber latex.

According to one characteristic, the silica is a precipitated silica.

According to another characteristic, the amount of silica during the operation in which two dispersions are brought into contact is between 20 phr and 150 phr, parts per hundred parts by weight of elastomer, preferably between 30 phr and 100 phr, preferentially between 30 phr and 90 phr and more preferably still between 30 phr and 70 phr.

According to one embodiment of the invention, the calcium salt is preferably chosen from calcium sulphates, calcium halides, calcium carbonates, calcium phosphates, calcium hydroxides, calcium oxalates and calcium nitrates and, more preferably still, the calcium salt is a calcium chloride.

Another embodiment of the invention is a masterbatch of diene elastomer and silica prepared according to the method which comprises the following successive stages:
preparing at least one dispersion of silica in water,
bringing into contact and mixing an elastomer latex and the aqueous silica dispersion in the presence of a calcium salt,
recovering the coagulum,
drying the recovered coagulum in order to obtain the masterbatch;
the molar content of calcium cations, defined as the number of moles of calcium cations of the calcium salt per unit of silica surface area (expressed in mol/m$^2$), is between $1.19 \times 10^{-6}$ and $2.81 \times 10^{-6}$ mol/m$^2$.

A further subject-matter of the invention is a rubber composition based on at least one masterbatch as mentioned above, and also a finished or semi-finished article, a tire tread or a tire or semi-finished product comprising at least one such rubber composition.

DETAILED DESCRIPTION OF SPECIFIC EMBODIMENTS

Measurements and Tests
Calculation of the Molar Content of Metal Cations
The molar content of calcium cations is defined as the number of moles of calcium cations of the calcium salt per unit of silica surface area (expressed in mol/m$^2$), the unit of silica surface area being defined as the weight of silica under consideration multiplied by the BET specific surface.

Thus, for a weight w1 of metal salt, having a molar mass M1 and a number N of metal atoms per salt molecule, added to a weight w2 of silica (irrespective of the fact that the silica is or is not already dispersed in aqueous solution) having a specific surface measured by BET of S2 (in m$^2$/g), the molar content of metal cations, expressed in mol/m$^2$, is equal to: $[(w1/M1)*N]/(w2*S2)$.

The BET specific surface is determined according to the Brunauer-Emmett-Teller method described in The Journal of the American Chemical Society, Vol. 60, page 309, February 1938, and corresponding to Standard NF T 45007.

Measurement of the Filler Content by TGA
This procedure has the object of quantifying the categories of constituents of the rubber mixtures. Three temperature intervals are distinguished, each of which corresponds to a category of constituents:
between 250 at 550° C., corresponding to organic materials: elastomers, oils, vulcanisation agents, and the like,
between 550 and 750° C., corresponding to intermediate losses (carbon-based materials),
above 750° C., corresponding to ash and inorganic products: ZnO, possibly silica, and the like.
It applies equally well to raw mixtures and to cured mixtures.
a) Equipment
Assembly for thermogravimetric analysis on a Mettler Toledo analyser: model TGA 851 or TGA DSC1
$1/100$ mg balance, make and model of the balance
70 µl (coverless) alumina crucibles, Mettler Toledo, ref. 00024123
Various items of laboratory equipment: tongs, scissors, and the like.
b) Principle
The weight losses of a mixture sample subjected to a temperature rise are monitored. The temperature rise takes place in 2 stages:
1/Heating from 25 to 550° C. under an inert atmosphere (N$_2$) in order to evaporate the volatile materials and to pyrolyse the organic materials. The volatility of the products which result therefrom brings about a weight loss corresponding, in a 1$^{st}$ step (before 300° C.), to the volatile materials and then to the organic materials initially present in the mixture.
2/Continuing the heating up to 750° C. under an oxidizing atmosphere (air or O$_2$) in order to bring about the combustion of the black (and/or carbon-based materials). The volatility of the products which result therefrom brings about a weight loss corresponding to the initial amount of black (and/or carbon-based materials).

The products which remain after these treatments constitute ash. They are generally inorganic materials of ZnO or silica type, and the like.

c) Measurements c)-1—Preparation of the Samples

The amount of product analysed has to be weighed out to within 0.01 mg and has to be between 20 and 30 mg.

It is subsequently placed in a 70 µl (coverless) alumina crucible.

c)-2—Definition of the "method" (temperature program)

The following segments are successively defined:

$1^{st}$ segment: dynamic from 25° C. to 550° C. at 50° C./min, under nitrogen (40 ml/min)

2nd segment: dynamic from 550° C. to 750° C. at 10° C./min, under air (or $O_2$)(40 ml/min)

The "blank curve subtraction" field is activated.

Any measurement is automatically corrected by a blank curve. The latter is produced under the same conditions as the measurement, with an empty crucible. It is stored in memory and used for all the following measurements (no new blank test necessary before each measurement).

c)-3—Setting the measurement under way

It is ascertained beforehand, by consulting the control window of the furnace, that the nitrogen and air flow rates are suitably regulated (40 µl/min) If not, they are adjusted using the adjustments located on the "gas box".

Blank Curve

The blank curve is produced by following the procedure described in the TGA operating manual.

Measurement

The measurement is carried out by following the procedure described in the TGA operating manual.

c)-4—Use of the Curve

By following the instructions of the TGA operating manual the curve to be used is selected and opened the $1^{st}$ stationary phase, corresponding to the volatile materials, is delimited on this curve between 25° C. and approximately 250° C. respectively the weight loss corresponding to the content of volatile materials (in %) is calculated the $2^{nd}$ stationary phase, corresponding to organic materials, is delimited on this curve between the temperature of the $1^{st}$ stationary phase, approximately 250° C., and 550° C. respectively the weight loss corresponding to the content of organic materials (in %) is calculated the $3^{rd}$ stationary phase, corresponding to the losses, is delimited on this curve between 550° C. and 750° C. respectively the weight loss corresponding to these losses (in %) is calculated the residue or ash content (in %) is calculated.

c)-5—Presence of Volatile Compounds

For some mixtures comprising volatile compounds which can evaporate at ambient temperature, there is a risk of losses of material between the preparation of the sample and the actual start of the measurement.

These losses are not taken into account by the apparatus.

It is possible, in order to take these losses into account and to have the true composition of the mixture, to proceed in the following way:

Stages c)-1 to c)-3 described above are carried out with the 2 following set points:

during the preparation of the sample: the weight of the empty crucible (W0) and the weight of the sample W1 are noted when setting the measurement under way: the "crucible weight" field is filled in with W0 and the "sample weight" field is filled in with W1.

For the use (stage c)-4), the TGA takes into account, in order to determine the losses, the weight of the sample W2, which it calculates at the actual start of the measurement from the weight of the crucible, which is essential for the calculation of the residue; W2 is calculated by the TGA by taking into account the weight W3 (crucible+sample) at the time T0−W0.

The calculation of the contents of the different constituents and of the residue is carried out with respect to the sample weight W1 defined during the preparation and not with respect to W2.

The content of volatile materials then calculated by the apparatus is erroneous since a portion of VM, volatile materials, (W1−W2) has evaporated during the wait between the preparation and the actual start of the measurement.

The VM values thus have to be recalculated manually:

by weight VM mg =(W1−W2) mg+$1^{st}$ stationary phase losses mg by content Ct VM %=VM mg/P1×100 or 100−$1^{st}$ stationary phase residue %.

c)-6—Content of Filler in Pcom

This content is expressed in pcom, percentage of organic matter, and is obtained by the calculation, when the TGA measurement is interpreted, with the following formula:

$$Ct\ filler(pcom)=[(D)/(B+C)]*100$$

in which B represents the percentage of organic matter (interval between 250 and 550° C.), C represents the percentage of intermediate losses (between 550 and 750° C.) and D represents the percentage of residue (above 750° C.).

Measurement of the Coagulation Yield

The coagulation yield corresponds to the ratio of the recovered dry weight (from which the weight of residual volatile materials after drying, as is defined in the TGA measurement protocol in the preceding sections, has been taken away) to the weight targeted at the start, multiplied by one hundred.

The method for preparing a masterbatch of diene elastomer and silica according to embodiment of the invention comprises the following successive stages:

preparing at least one dispersion of silica in water, bringing into contact and mixing an elastomer latex and the aqueous silica dispersion in the presence of a calcium salt, in order to obtain a coagulum, recovering the coagulum, drying the recovered coagulum in order to obtain the masterbatch;

the molar content of calcium cations, defined as the number of moles of calcium cations of the calcium salt per unit of silica surface area (expressed in mol/m²), is between $1.19 \times 10^{-6}$ and $2.81 \times 10^{-6}$ mol/m².

Preparation of the Aqueous Silica Dispersion

Any silica ($SiO_2$) known to a person skilled in the art can be used for the embodiments disclosed herein, in particular any precipitated or fumed silica exhibiting a BET specific surface and also a CTAB specific surface both less than 450 m²/g, preferably from 30 to 400 m²/g.

It is possible in particular to use highly specific silicas (referred to as "HDSs"); mention will be made, for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG, the Zeopol 8715, 8745 and 8755 silicas from Huber or silicas having a high specific surface, as described in Application WO 03/16837.

The silica is subsequently dispersed in water, preferably so as to obtain a dispersion from which the viscosity is sufficient to be easily "handleable". Preferably, the concentration by weight of silica in the dispersion is between 0.1% and 30%. It will be possible, for example, to produce an aqueous silica dispersion with a content of silica in the water of 4% by weight.

Advantageously, the dispersion is sheared by sonication in order to make it possible to stabilise the aggregates in the water, which makes it possible to improve the dispersion of the silica in the masterbatch subsequently produced.

This sonication can be carried out in particular using a 1500 watt Vibracell generator manufactured by Sonics and Materials Inc., with a PZT (reference 75010) crystal piezoelectric converter, a booster for the probe and a titanium alloy probe with a diameter of 19 mm (for a height of 127 mm).

According to one embodiment of the invention, the calcium salt is subsequently added and the combined product is stirred using a spatula. It should be noted that it is advantageously possible to add the calcium salt to the aqueous silica dispersion before the sonication stage, in order in particular to improve the solubilization of the salt in the aqueous dispersion produced.

Calcium Salt

The calcium salts chosen from calcium sulphates, calcium halides, in particular chlorides, bromides, fluorides and iodides, calcium carbonates, calcium phosphates, calcium hydroxides, calcium oxalates and calcium nitrates are particularly suitable and more preferably still the chosen calcium salt is a calcium chloride.

It is clear that it is possible to envisage using a blend of the different abovementioned calcium salts.

Diene Elastomer Latex

As said above, the elastomer latex is a particular form of the elastomer which exists in the form of elastomer particles dispersed in water.

The disclosure relates to diene elastomer latexes, the diene elastomers being defined as follows:

"Diene" elastomer or rubber should be understood as meaning, in a known way, an elastomer resulting at least in part (i.e., a homopolymer or a copolymer) from diene monomers (monomers carrying two carbon-carbon double bonds which may or may not be conjugated).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content of units of diene origin, always less than 15%). In the category of "essentially unsaturated" diene elastomers, "highly unsaturated" diene elastomer is understood to mean in particular a diene elastomer having a content of units of diene origin (conjugated dienes) which is greater than 50%.

Furthermore, among these diene elastomers, a distinction is made between natural rubber and synthetic elastomers.

Natural rubber (NR), which is particularly suitable for embodiments of the invention, exists in different forms, as described in detail in Chapter 3, "Latex concentrates: properties and composition", by K. F. Gaseley, A. D. T. Gordon and T. D. Pendle, in "Natural Rubber Science and Technology", A. D. Roberts, Oxford University Press, 1988.

In particular, several forms of natural rubber latex are commercially available: natural rubber latexes, referred to as field latexes, concentrated natural rubber latexes, epoxidized latexes (ENR), deproteinized latexes or prevulcanized latexes. Field natural rubber latex is a latex to which ammonia has been added in order to prevent premature coagulation and concentrated natural rubber latex corresponds to a field latex which has been subjected to a treatment corresponding to washing, followed by concentrating. The various categories of concentrated natural rubber latex are listed in particular in Standard ASTM D 1076-06. Among these concentrated natural rubber latexes, a distinction is made in particular between concentrated natural rubber latexes of HA (high ammonia) grade and those of LA grade; use may advantageously be made, for embodiments of the invention, of concentrated natural rubber latexes of HA grade.

The latex can be used directly or can be diluted beforehand in water in order to facilitate the use thereof.

Synthetic diene elastomers capable of being used in accordance with embodiments of the invention diene elastomer is understood to mean more particularly:

(a) —any homopolymer obtained by polymerization of a conjugated diene monomer having from 4 to 12 carbon atoms;

(b) —any copolymer obtained by copolymerization of one or more conjugated dienes with one another or with one or more vinylaromatic compounds having from 8 to 20 carbon atoms;

(c) —a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d) —a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methyl styrene, ortho, the "vinyltoluene" commercial mixture, para-(tert-butyl)styrene, methoxystyrenes, chlorostyrenes, vinylmesitylene, divinylbenzene or vinyl-naphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as aminobenzophenone, for example; for coupling with a reinforcing inorganic filler, such as silica, mention may be made, for example, of silanol or polysiloxane functional groups having a silanol end (such as described, for example, in FR 2 740 778 or U.S. Pat. No. 6,013,718, and WO 2008/141702), of alkoxysilane groups (such as described, for example, in FR 2 765 882 or U.S. Pat. No. 5,977,238), of carboxyl groups (such as described, for example, in WO 01/92402 or U.S. Pat. No. 6,815,473, WO 2004/096865 or US 2006/0089445) or of polyether groups (such as described, for example, in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

To sum up, the synthetic diene elastomer or elastomers according to embodiments of the invention are preferably selected from the group of the highly unsaturated diene elastomers consisting of polybutadienes (abbreviated to "BRs"), synthetic polyisoprenes (IRs), butadiene copolymers, isoprene copolymers and the mixtures of these elastomers. Such copolymers are more preferably selected from the group consisting of butadiene/styrene copolymers (SBRs), isoprene/butadiene copolymers (BIRs), isoprene/styrene copolymers (SIRs) and isoprene/butadiene/styrene copolymers (SBIRs).

Thus, as synthetic elastomer latex, the latex can in particular consist of a synthetic diene elastomer already available in the emulsion form (for example, a copolymer of butadiene and of styrene, SBR, prepared in emulsion) or of a synthetic diene elastomer initially in solution (for example an SBR prepared in solution) which is emulsified in a mixture of organic solvent and water, generally using a surface-active agent.

A latex of SBR, in particular an SBR prepared in emulsion ("ESBR") or an SBR prepared in solution ("SSBR"), more particularly an SBR prepared in emulsion, is particularly suitable for the embodiments disclosed herein.

There exist two main types of processes for the emulsion copolymerization of styrene and of butadiene, one of them, or hot process (carried out at a temperature of approximately 50° C.), being suitable for the preparation of highly branched SBRs while the other, or cold process (carried out at a temperature which can range from 15° C. to 40° C.), makes it possible to obtain more linear SBRs.

For a detailed description of the effectiveness of several emulsifiers which can be used in the said hot process (as a function of the contents of the said emulsifiers), reference may be made, for example, to the two papers by C. W. Carr, I. M. Kolthoff and E. J. Meehan, University of Minnesota, Minneapolis, Minn., which appeared in the Journal of Polymer Science in 1950, Vol. V, No. 2, pp. 201-206, and in 1951, Vol. VI, No. 1, pp. 73-81.

As regards comparative examples of implementation of the said cold process, reference may be made, for example, to the paper Industrial and Engineering Chemistry, 1948, Vol. 40, No. 5, pp. 932-937, E. J. Vandenberg and G. E. Hulse, Hercules Powder Company, Wilmington, Del., and to the paper Industrial and Engineering Chemistry, 1954, Vol. 46, No. 5, pp. 1065-1073, J. R. Miller and H. E. Diem, B. F. Goodrich Chemical Co., Akron, Ohio.

In the case of an SBR (ESBR or SSBR) elastomer, use is made in particular of an SBR having a moderate styrene content, for example of between 20% and 35% by weight, or a high styrene content, for example from 35 to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

It should be noted that it is possible to envisage using one or more natural rubber latexes as a blend, one or more synthetic rubber latexes as a blend or a blend of one or more natural rubber latexes with one or more synthetic rubber latexes.

Bringing the Two Dispersions into Contact

The two dispersions are brought into contact in the presence of a calcium salt.

Advantageously, the salt is added to the aqueous silica dispersion as was explained above, that is to say during the formation of the aqueous silica dispersion or after its formation. However, it would also be possible to envisage adding the calcium salt during the operation in which the aqueous silica dispersion and the elastomer latex are brought into contact. In the latter case, the salt can advantageously be introduced in the form of a saline solution.

In order to make possible the satisfactory mixing of these solutions, the latter are, for example, poured into a beaker with magnetic stirring.

It is also possible to use any type of device which makes possible "efficient" mixing of two products in the liquid phase; thus, it will be possible to use a static mixer, such as static mixers sold by Noritake Co. Limited, TAH in the USA, Koflo in the USA, or Tokushu Kika Kogyo Co. Ltd, or a mixture which produces high shear, such as mixers sold by Tokushu Kika Kogyo Co. Ltd, by PUC in Germany, by Cavitron in Germany or by Silverson in the United Kingdom.

It is clear that, the more efficient the mixing stage, the better the dispersion and the homogeneity of the silica-diene elastomer masterbatch.

During this phase of mixing the two dispersions, a coagulum of elastomer and of silica is formed, either in the form of just one solid component in the solution or in the form of several separate solid components.

Surprisingly, it has been found that, in order to actually obtain a coagulum, with a coagulation yield of greater than or equal to 80% and which corresponds to the production of a masterbatch observing the initial ratio by weight of filler with respect to the elastomer, a difference of 20% with respect to the ratio initially calculated being regarded as acceptable, the molar content of calcium cations, defined as the number of moles of calcium cations of the calcium salt per unit of silica surface area (expressed in mol/m$^2$), has to be between $1.19 \times 10^{-6}$ and $2.81 \times 10^{-6}$ mol/m$^2$.

The volumes of the two dispersions to be brought into contact and in particular the volume of silica dispersion depend on the silica content targeted for the masterbatch to be produced, taking into account, of course, the respective concentrations of the dispersions. Thus, the volume will be accordingly adapted. Advantageously, the silica content targeted for the masterbatch is between 20 and 150 phr (parts by weight per hundred parts of elastomer), preferably between 30 and 100 phr and more preferably between 30 and 90 phr, more preferably still between 30 and 70 phr.

Recovery of the Solid Formed

The solid or solids recovered are filtered or centrifuged. This is because the filtering operation, which can be carried out using a filtration sieve or cloth, may prove to be unsuitable when the coagulum exists in the form of numerous small solid components. In such a case, an additional centrifuging operation is preferably carried out.

On conclusion of this filtering or centrifuging stage, the coagulum obtained is dried, for example in an oven.

On conclusion of the drying stage, the dry coagulum obtained can advantageously be homogenized in order to ensure that the sample withdrawn for the measurement of the content of filler is representative, for example by carrying out gentle mechanical working on an open mill.

On conclusion of this operation, the content of filler is measured by TGA and the coagulation yield is also measured.

Rubber Composition

Advantageously, the masterbatches thus produced are capable of being used in rubber compositions, in particular for tires.

The rubber compositions for tires based on the masterbatches according to embodiments of the invention can also comprise, in a known way, a coupling agent and a vulcanization system.

It should be remembered here that the term "coupling agent" is understood to mean, in a known way, an agent capable of establishing a satisfactory connection, of chemical and/or physical nature, between the inorganic filler and the diene elastomer; such a coupling agent, which is at least bifunctional, has, for example, the simplified general formula "Y—Z—X", in which:

Y represents a functional group ("Y" functional group) which is capable of being bonded physically and/or chemically to the inorganic filler, it being possible for such a bond to be established, for example, between a silicon atom of the coupling agent and the surface hydroxyl (—OH) groups of the inorganic filler (for example the surface silanols, when silica is concerned);

X represents a functional group ("X" functional group) capable of being bonded physically and/or chemically to the diene elastomer, for example via a sulphur atom;

Z represents a divalent group which makes it possible to connect Y and X.

Coupling agents, in particular silica/diene elastomer coupling agents, have been described in a very large number of documents, the most well known being bifunctional organosilanes bearing alkoxyl functional groups (that is to say, by definition, "alkoxysilanes") as "Y" functional groups and, as "X" functional groups, functional groups capable of reacting with the diene elastomer, such as, for example, polysulphide functional groups.

Mention should in particular be made, among the known alkoxysilane polysulphide compounds, of bis(3-triethoxysilylpropyl)tetrasulphide (abbreviated to "TESPT"), of formula $[(C_2H_5O)_3Si(CH_2)_3S_2]_2$, sold in particular by Degussa under the name "Si69" (or "X50S", when it is supported at 50% by weight on carbon black), in the form of a commercial mixture of polysulphides $S_x$ with a mean value for x which is approximately 4.

It should be noted that it is possible to envisage the introduction of a coupling agent in the preparation of the masterbatch in order to directly obtain a masterbatch of elastomer and silica also comprising a coupling agent. The coupling agent can thus be added before or during the operation in which the aqueous silica dispersion and the diene elastomer latex are brought into contact.

These rubber compositions in accordance with embodiments of the invention can also comprise all or a portion of the usual additives generally used in the elastomer compositions intended for the manufacture of tires, in particular of treads, such as, for example, plasticizers or extending oils, whether the latter are aromatic or nonaromatic in nature, pigments, protection agents, such as antiozone waxes, chemical antiozonants or antioxidants, antifatigue agents, reinforcing resins, methylene acceptors (for example phenolic novolak resin) or methylene donors (for example HMT or H3M), as described, for example, in Application WO 02/10269, a crosslinking system based either on sulphur or on sulphur donors and/or on peroxide and/or on bismaleimides, or vulcanization accelerators.

Preferably, these compositions comprise, as preferred nonaromatic or very slightly aromatic plasticizing agent, at least one compound selected from the group consisting of naphthenic oils, paraffinic oils, MES oils, TDAE oils, glycerol esters (in particular trioleates), plasticizing hydrocarbon resins exhibiting a high Tg preferably of greater than 30° C., and the mixtures of such compounds.

These compositions can also comprise, in addition to the coupling agents, coupling activators, covering agents (for example comprising only the Y functional group) for the reinforcing inorganic filler or more generally processing aids capable, in a known way, by virtue of an improvement in the dispersion of the inorganic filler in the rubber matrix and of a lowering of the viscosity of the compositions, of improving their property of processing in the raw state, these agents being, for example, hydrolysable silanes, such as alkylalkoxysilanes (in particular alkyltriethoxysilanes), polyols, polyethers (for example polyethylene glycols), primary, secondary or tertiary amines (for example trialkanolamines), hydroxylated or hydrolysable POSs, for example α,Ω-dihydroxy-polyorganosiloxanes (in particular α,Ω-dihydroxy-polydimethylsiloxanes), or fatty acids, such as, for example, stearic acid.

It could also be possible to envisage incorporating, in the masterbatch, before the formation of the coagulum, the additives described above, oil, antioxidant, covering agent, and the like.

Manufacture of the Rubber Compositions

The rubber compositions of embodiments of the invention are manufactured in appropriate mixers, using two successive phases of preparation according to a general procedure well known to a person skilled in the art: a first phase of thermomechanical working or kneading (sometimes referred to as "non-productive" phase) at high temperature, up to a maximum temperature of between 130° C. and 200° C., preferably between 145° C. and 185° C., followed by a second phase of mechanical working (sometimes referred to as "productive" phase) at lower temperature, typically below 120° C., for example between 60° C. and 100° C., during which finishing phase the crosslinking or vulcanization system is incorporated.

According to a preferred embodiment of the invention, all the base constituents of the compositions, with the exception of the vulcanization system, namely the masterbatch, the coupling agent (if it is not already present in the masterbatch) and the carbon black, if appropriate, are intimately incorporated, by kneading, in the diene elastomer during the first "non-productive" phase, that is to say that at least these various base constituents are introduced into the mixer and that they are thermomechanically kneaded, in one or more stages, until the maximum temperature of between 130° C. and 200° C., preferably of between 145° C. and 185° C., is reached.

By way of example, the first (non-productive) phase is carried out in a single thermomechanical stage during which all the necessary constituents, the optional additional covering agents or processing aids and various other additives, with the exception of the vulcanization system, are introduced into an appropriate mixer, such as an ordinary internal mixer. The total duration of the kneading, in this non-productive phase, is preferably 1 and 15 min. After cooling the mixture thus obtained during the first non-productive phase, the vulcanization system is then incorporated at low temperature, generally in an external mixer, such as an open mill; everything is then mixed (productive phase) for a few minutes, for example between 2 and 15 min.

When a covering agent is used, it can be incorporated completely during a non-productive phase, at the same time as the inorganic filler, or else completely during the productive phase, at the same time as the vulcanization system, or also split up over the two successive phases.

It should be noted that it is possible to introduce all or a portion of the covering agent in a form supported (it being placed on the support beforehand) or a solid compatible with the chemical structures corresponding to this compound. For example, when splitting up between the two successive phases above, it can be advantageous to introduce the second portion of the covering agent, on the external mixer, after being placed on a support in order to facilitate the incorporation thereof and the dispersion thereof.

The crosslinking system is preferably a vulcanization system, that is to say a system based on sulphur (or on a sulphur-donating agent) and on a primary vulcanization accelerator. Additional to this base vulcanization system are, incorporated during the first non-productive phase and/or during the productive phase, as are described subsequently, various known secondary vulcanization accelerators or vulcanization activators, such as zinc oxide, stearic acid or equivalent compounds, or guanidine derivatives (in particular diphenylguanidine).

The sulphur is used at a preferred content of between 0.5 and 12 phr, in particular between 1 and 10 phr. The primary vulcanization accelerator is used at a preferred content of between 0.5 and 10 phr, more preferably of between 0.5 and 5.0 phr.

Use may be made, as (primary or secondary) accelerator, of any compound capable of acting as accelerator of the vulcanization of diene elastomers in the presence of sulphur, in particular accelerators of the thiazole type and their derivatives, accelerators of thiuram type or accelerators of zinc dithiocarbamate type. These accelerators are, for example, selected from the group consisting of 2-mercaptobenzothiazyl disulphide (abbreviated to "MBTS"), tetrabenzylthiuram disulphide ("TBZTD"), N-cyclohexyl-2-benzothiazolesulphenamide ("CBS"), N,N-dicyclohexyl-2-benzothiazolesulphenamide ("DCBS"), N-(tert-butyl)-2-benzothiazolesulphenamide ("TBBS"), N-(tert-butyl)-2-benzothiazolesulphenimide ("TBSI"), zinc dibenzyldithiocarbamate ("ZBEC") and the mixtures of these compounds.

The final composition thus obtained is subsequently calendered, for example in the form of a sheet or a plaque, in particular for laboratory characterization, or also extruded in the form of a rubber profiled element which can be used, for example, as a passenger vehicle tire tread.

EXAMPLES

Preparation of the Masterbatches

Equipment
preparation of the aqueous silica dispersion
Thermobalance of HR73 Halogen Moisture Analyser type from Mettler Toledo (confirmation of volatile material content of the silica)
Balance of PG5002-S Delta Range® type (max. 5100 g, accuracy of 0.1/0.01 g) from Mettler Toledo (weighings silica+water)
100 ml low-form glass beaker
Balance of AG204 type (max. 210 g, accuracy of 0.1 mg) from Mettler Toledo (for weighing the salt)
1500 Watt Vibracell ultrasound generator manufactured by Sonics and Materials Inc. (ref.: VC1500, 20 kHz), with a PZT crystal piezoelectric converter (reference CV154), a booster for the probe (ref. BHN15GD, amplitude increased by 50%) and a standard non-threaded probe (not high gain) made of titanium alloy with a diameter of 19 mm (for a height of 127 mm)
Magnetic stirrer of MR3003 type from Heidolph
Straight magnetic bar with a length of 25 mm and a diameter of 8 mm
preparation of the latex
Thermobalance of HR73 Halogen Moisture Analyser type from Mettler Toledo (confirmation of volatile material content of the latex)
Balance of PG5002-S Delta Range® type (max. 5100 g, accuracy of 0.01 g) from Mettler Toledo (weighings latex+water)
250 ml low-form glass beaker
bringing into contact
Magnetic stirrer of MR3003 type from Heidolph
Straight magnetic bar with a length of 25 mm and a diameter of 8 mm
recovery
Centrifuge of 4K15 type from Sigma Laboratory Centrifuges Bioblock Scientific, equipped with a Sigma rotor, reference No. 12256 (max. 6×400 g)
250 ml Nalgene® bottle
Reactants
silica:
precipitated silica 160 MP (Zeosil 1165 MP), manufactured by Rhodia, with a BET specific surface measured at 160 $m^2/g$, with a true density of 2.14 $g/cm^3$, with a content of "surface" silanol functional groups (measured by Me(OH) grafting) of 7.4 $OH/nm^2$ and a "total" content of silanol functional groups (measured by TGA) of 12 $OH/nm^2$,
Salt:
calcium chloride ($CaCl_2.2H_2O$), purity greater than or equal to 99.0% by weight, ACS Reagent grade, CAS 110035-04-81, reference 223506-500G, sold by Aldrich, Latex:
  natural rubber latex of HA grade, sold by Trang Latex/Beetex (Thailand), having a solids content measured at 61.12%, pH of approximately 10.65, comprising approximately 20-25 ppm of $Mg^{2+}$,
Water:
  ultrapure water (18.2 MΩcm).
Procedure
Preparation of a Masterbatch of 10.5 g in Theory
  For the examples, an amount of silica of 50 parts by weight per hundred parts of elastomer was chosen, which corresponds here to 50 pcom (this is because the masterbatches described here comprise only silica and the diene elastomer).
    preparation of the aqueous silica dispersion (4% by weight)
  3.5 dry g equivalents of silica are weighed out and approximately 84 g of ultrapure water are added. Of course, the amount of absorbed water present in the silica has to be taken into account; thus, for example, 3.5 dry g equivalent of silica comprising 6.36% by weight of volatile material=3.74 g of silica to be weighed out and the 84 g of water in order to obtain a 4% by weight slurry become 84-(3.74-3.5)=83.76 g.
  The amount of calcium chloride is weighed out and is introduced into the aqueous silica suspension (brought into contact for at least 10 minutes).
  The [silica+water+salt] suspension is subjected to ultrasound for 8 minutes at 60% of the maximum power of the ultrasound generator, the 100 ml beaker being maintained at a set temperature by being immersed in an ice bath.
  The dispersion thus obtained, correctly subjected to ultrasound, is subsequently kept magnetically stirred (500 rev/min) until the contacting operation.
    preparation of the latex (30% by weight)
  The latex is weighed out and its concentration is adjusted (dilution by addition of ultrapure water).
    bringing into contact
  The dispersion obtained above [silica+water+salt] is poured into the latex with magnetic stirring (500 rev/min)
  The combined mixture is stirred at 500 rev/min for 3 minutes.
    recovery
  In order to have identical conditions of the procedure for the various tests, the coagulum formed or the solids formed (currently referred to as "crumbs") are centrifuged, including in the cases where the visual appearance of the coagulum allowed a filtering operation to be envisaged.
  Centrifuging is carried out, after transfer into a 250 ml Nalgene bottle, using a Sigma 4K15 bucket centrifuge at 8000 revolutions/min for 10 minutes.
  The coagulum (in the form of a pellet) thus recovered is dried in a fume cupboard at ambient temperature for 24 hours and then under vacuum, under 100 to 300 mbar, in an oven at 65° C. for 24 h, in order to remove the final traces of water.
  The content of filler is then measured by TGA and the coagulation yield is also measured on the masterbatch thus produced. Advantageously, a gentle mechanical working can be carried out, such as on an open mill, in order to homogenize the coagulum and to ensure that the sampling for the measurement is representative. It is also possible to carry out several TGA measurements on the coagulum (for example 10 measurements) in order to produce the mean thereof in order to have a value representative of the whole of the coagulum.

Example

The aim of this example is to demonstrate the satisfactory operation of the method in accordance with the invention, in particular with respect to the molar content of calcium cations, the calcium salt used in this example being a calcium chloride $CaCl_2.2H_2O$, as specified in section III-1.

Tests E1, E2, E3 and E4 are carried out in accordance with the process described in detail in the preceding section, with:
  a high ammonia concentrated natural rubber latex originating from the supplier Trang Latex/Beetex (Thailand), having a solids content measured at 61.12%, as specified in section III-1, and which was diluted twofold,
  an amount of silica, during the operation in which the two dispersions are brought into contact, of 50 phr.

The only difference between these four tests consists, during the procedure described in detail above, of the amount of calcium cations introduced during the addition of calcium salt to the aqueous silica dispersion.

Thus, tests E1, E2 and E3 differ from one another as follows:
  for E1, the molar content of calcium cations is $1.12 \times 10^{-6}$ (corresponding to a weight of calcium chloride hydrate of 0.097 g for a targeted masterbatch of 10.5 g, comprising 50 parts by weight per hundred parts of elastomer targeted),
  for E2, the molar content of calcium cations is $1.56 \times 10^{-6}$ (corresponding to a weight of calcium chloride hydrate of 0.130 g),
  for E3, the molar content of calcium cations is $2.31 \times 10^{-6}$ (corresponding to a weight of calcium chloride hydrate of 0.195 g),
  for E4, the molar content of calcium cations is $3.12 \times 10^{-6}$ (corresponding to a weight of calcium chloride hydrate of 0.259 g).

The results obtained (yield and content of filler) for these four tests are presented in the following Table 1:

TABLE 1

| Test | Yield (% by weight) | Content of filler (pcom) |
|---|---|---|
| E1 | — | — |
| E2 | 95.6 | 50.9 |
| E3 | 95.4 | 47.7 |
| E4 | 74.3 | 26.5 |

It is found that test E1, not in accordance with the invention, did not make possible the coagulation of the elastomer with the silica. A phase separation of the silica and the latex occurred during the stage of recovery by centrifuging; no coagulum was thus obtained.

For tests E2 and E3 in accordance with the invention, both acceptable contents of silica (between 40 pcom and 60 pcom) and a yield of greater than 80% were obtained.

For test E4 not in accordance with the invention, it is found that, even though a masterbatch was obtained, the yield is at the limit of acceptability and in particular the content of silica (26.5 pcom) is outside the acceptable contents.

It is clearly apparent that it is important to be within a given range of molar content of calcium cations in order to meet the criteria desired in terms of content of filler observed and yield obtained.

The invention claimed is:
1. A method for preparing a masterbatch of diene elastomer and silica comprising:
  preparing at least one dispersion of silica in water,
  bringing into contact and mixing an elastomer latex and the aqueous silica dispersion in the presence of an at least divalent calcium salt, thereby obtaining a coagulum,
  recovering the coagulum, drying the recovered coagulum, thereby obtaining a masterbatch;

wherein the molar content of calcium cations, defined as the number of moles of calcium cations of the calcium salt per unit of silica surface area, is between $1.19 \times 10^{-6}$ and $2.81 \times 10^{-6}$ mol/m$^2$.

2. The method according to claim 1, wherein the at least divalent calcium salt is added to the aqueous silica dispersion before the latter is brought into contact with the elastomer latex.

3. The method according to claim 1, wherein recovering of the coagulum comprises filtering.

4. The method according to claim 1, wherein the recovering of the coagulum comprises centrifuging.

5. The method according to claim 1, wherein the diene elastomer latex is a natural rubber latex.

6. The method according to claim 5, wherein the natural rubber latex is a concentrated natural rubber latex.

7. The method according to claim 6, wherein the silica is a precipitated silica.

8. The method according to claim 1, wherein the silica present during the bringing of the two dispersions into contact is an amount between 20 phr and 150 phr, parts per hundred parts by weight of elastomer.

9. The method according to claim 8, wherein the silica present during the bringing of the two dispersions into contact is an amount between 30 phr and 100 phr.

10. The method according to claim 9, wherein the amount of silica present during the bringing of the two dispersions into contact is an amount between 30 phr and 90 phr.

11. The method according to claim 10, wherein the calcium salt is selected from the group consisting of calcium sulphates, calcium halides and calcium nitrates.

12. The method according to claim 11 wherein the calcium salt is an calcium chloride.

13. The method according to claim 12, further comprising adding an aqueous dispersion of coupling agent before or during bringing the aqueous silica dispersion and the diene elastomer latex into contact.

14. A masterbatch of diene elastomer and silica prepared according to the method of claim 1.

15. A rubber composition based on at least one masterbatch according to claim 14.

16. A finished or semi-finished article comprising the rubber composition according to claim 15.

17. A tire tread comprising the rubber composition according to claim 15.

18. A tire or semi-finished product comprising at least one rubber composition according to claim 15.

* * * * *